United States Patent [19]

Mactaggart

[11] 4,439,038

[45] Mar. 27, 1984

[54] METHOD AND APPARATUS FOR MEASURING AND CONTROLLING THE COLOR OF A MOVING WEB

[75] Inventor: John W. Mactaggart, Bolton, Canada

[73] Assignee: Sentrol Systems Ltd., Downsview, Canada

[21] Appl. No.: 240,171

[22] Filed: Mar. 3, 1981

[51] Int. Cl.³ .......................................... G01N 21/27
[52] U.S. Cl. .................................. 356/408; 356/419; 364/526
[58] Field of Search ............... 356/410, 405, 406, 429, 356/419, 408, 418; 364/526

[56] References Cited

U.S. PATENT DOCUMENTS 3,936,189  2/1976  De Remigis ......................... 356/73
4,019,819  4/1977  Lodzinski ............................ 356/73
4,029,419  6/1977  Schumann, Jr. et al. ........... 356/173

OTHER PUBLICATIONS

James et al., Mathematics Dictionary, p. 253, Feb. 1966.
Cutler, "A New Colour-Matching Computer", JSDC, Dec. 1965, pp. 601-608.
Judd et al., "Color in Business, Science and Industry", Wiley, 1975.

Primary Examiner—Vincent P. McGraw
Assistant Examiner—L. A. Dietert
Attorney, Agent, or Firm—Shenier & O'Connor

[57] ABSTRACT

Apparatus for measuring and controlling the color of a moving web in which a circular variable bandpass filter having a passband varying substantially continuously with angular displacement through the optical spectrum is interposed in the optical path between the web and a detector and is rotated to produce a detector output which periodically scans the optical spectrum. In one disclosed embodiment, the detector outputs at the various wavelengths are weighted to produce X, Y and Z tristimulus values while, in another disclosed embodiment, dye flows are so controlled as to minimize the total square error between the measured reflectance spectrum and the desired reflectance spectrum.

8 Claims, 9 Drawing Figures

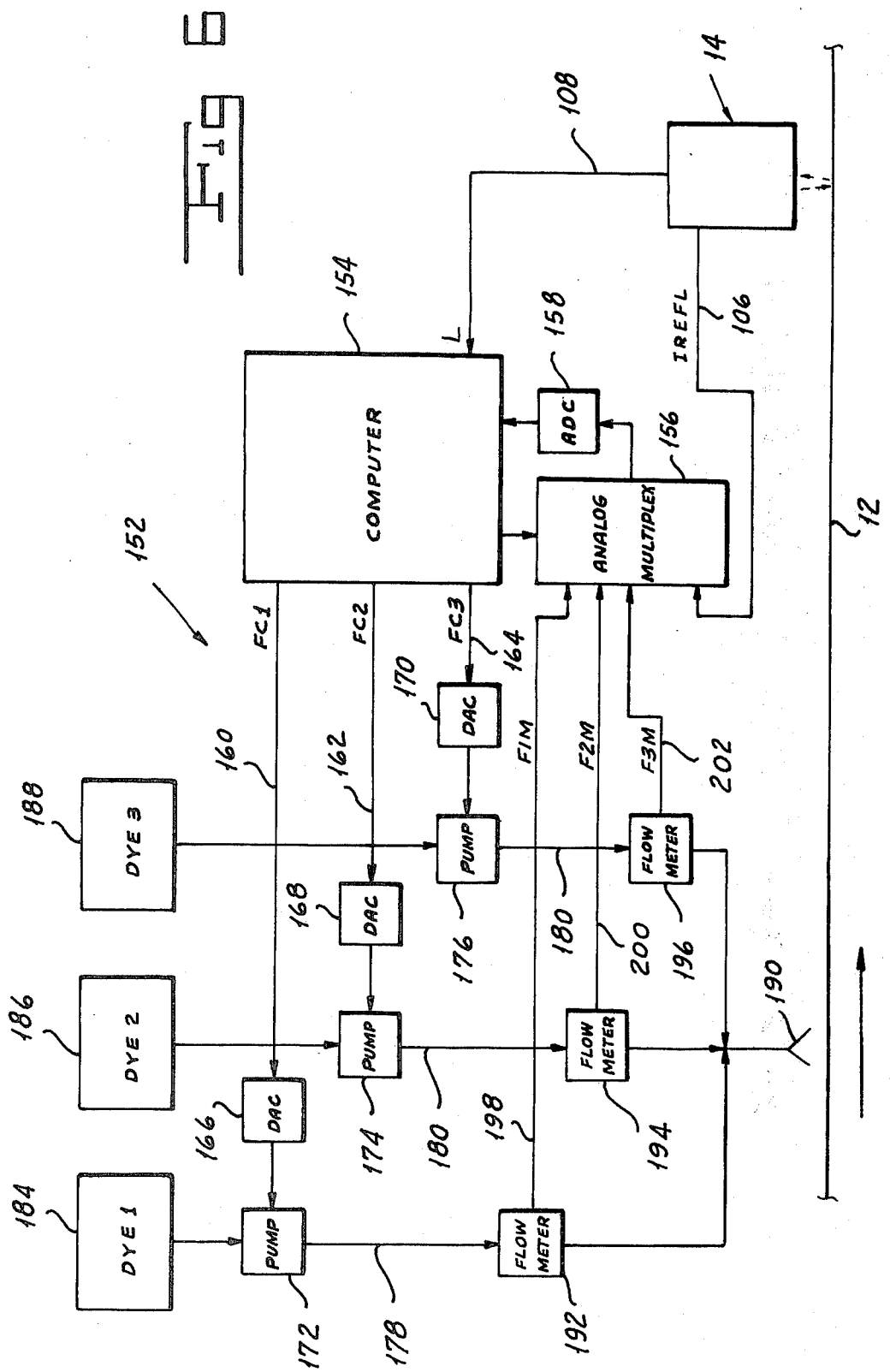

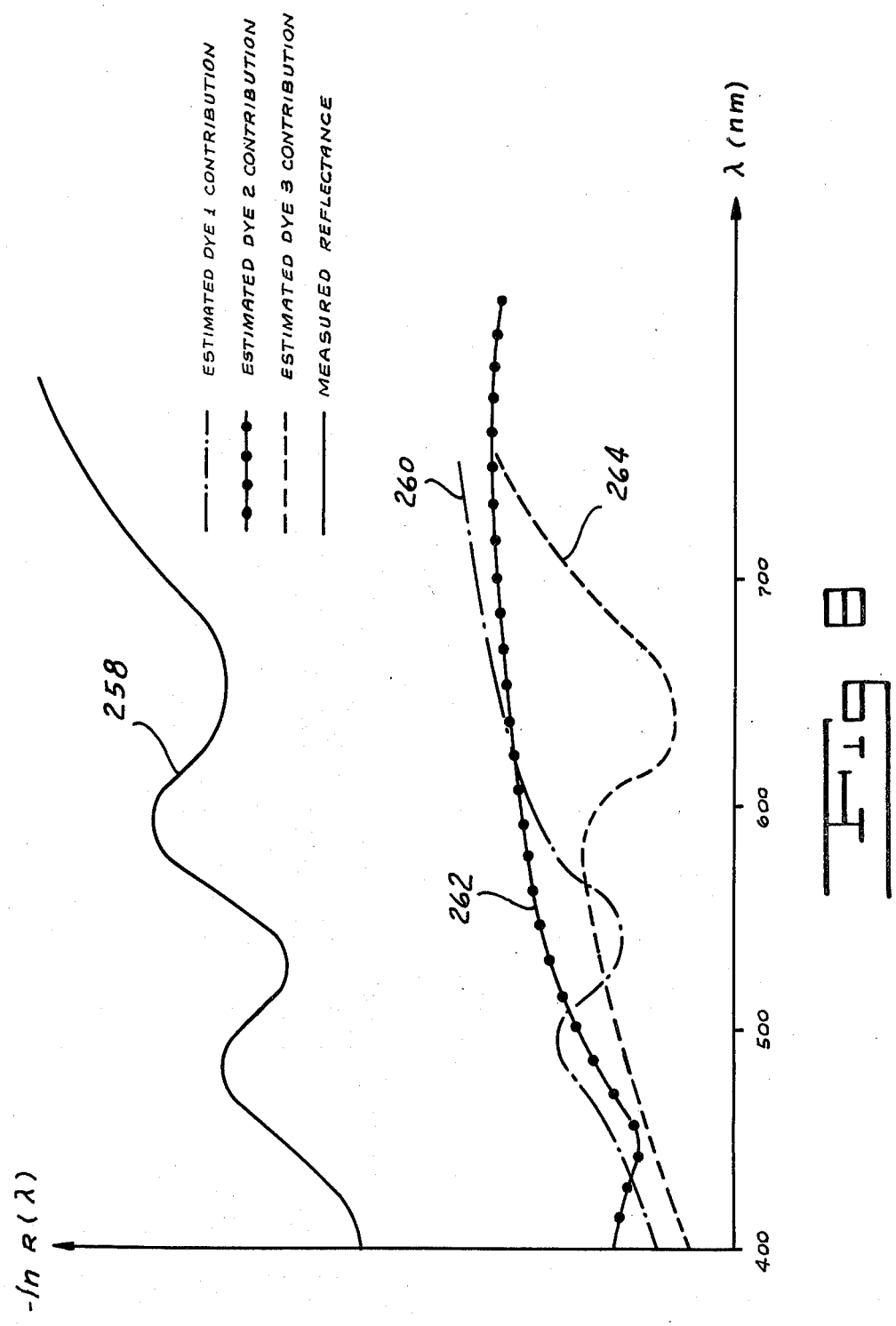

METHOD AND APPARATUS FOR MEASURING AND CONTROLLING THE COLOR OF A MOVING WEB

FIELD OF THE INVENTION

This invention relates to a method and apparatus for measuring and controlling color and, especially, to a method and apparatus for measuring and controlling the color of a moving web.

BACKGROUND OF THE INVENTION

In general, systems of the prior art for controlling the dyeing of a moving web operate by measuring the tristimulus values X, Y and Z of light reflected from a moving portion of the web. The tristimulus values, which are roughly equivalent to the "red," "green" and "blue" components, respectively, of the reflected light, are either measured simultaneously by different detectors, as in De Remigis U.S. Pat. No. 3,936,189, or successively using a filter wheel or the like as in Lodzinski U.S. Pat. No. 4,019,819. The tristimulus values X, Y and Z are either used directly for control purposes or are first converted to other coordinates such as Hunter coordinates L, a and b.

While three- or four-filter colorimeters of the type described above are common in the art and are adequate for ordinary control applications, they suffer serious drawbacks. First, the X, Y and Z tristimulus outputs are only indicative of the perceived color of the web under the illuminant used in the colorimeter. A color "match" obtained in terms of tristimulus values using a standard illuminant does not necessarily indicate a match with an illuminant having a different spectral composition, and, in general, it is impossible to predict the color properties of a material with a given illuminant if only its tristimulus values X, Y and Z are known. Further, if the actual spectral curves of the illuminant or detector used in the colorimeter differ from those for which the filters were designed, the tristimulus values obtained will not necessarily even indicate the color properties of the material under a standard illuminant. While Lodzinski does suggest, as an alternative, using a relatively large number of narrow-band filters so as to approximate an abridged spectrophotometer, he suggests no practical implementation of this proposal in an on-line system.

Another defect of control systems of the prior art arises from the nonlinearity of the relationship between the tristimulus values X, Y and Z and the dye concentrations to be controlled. While this nonlinearity is relatively insignificant at low dye concentrations, it increases with dye concentration so that, when relatively saturated colors are being sought, the nonlinearity is substantial. As a result, in practical systems, the relationship between X, Y and Z and the dye concentrations must be linearized about some nominal setpoint to make the computation tractable. This need for linearization is obviously disadvantageous, since not only does the operating point vary about the setpoint, but the setpoint itself is often changed, necessitating a recomputation of the linearized equation.

McCarty U.S. Pat. No. 3,601,589 discloses a system for selecting pigments to match a given surface coating in which an initial pigment formulation is generated in advance of actual mixing by selecting those concentrations which minimize the total square error between the measured reflectance of the coating being matched and the computed reflectance of the pigment formulation. However, the actual mixing process itself is controlled by sampling the mixture with a colorimeter and using L, a and b coordinates computed from the colorimeter output to correct the initial pigment formulation.

SUMMARY OF THE INVENTION

One object of my invention is to provide a color measurement and control system which insures a color match under an arbitrary illuminant.

Another object of my invention is to provide a color measurement and control system which does not require matching of the spectral curves of its various optical components.

Still another object of my invention is to provide a color measurement and control system which is relatively insensitive to changes in operating point.

A further object of my invention is to provide a color measurement and control system which permits the independent control of four or more dyes.

Other and further objects will be apparent from the following description.

In one aspect, my invention contemplates apparatus for measuring the optical reflections of a surface such as that of a moving web in which a first predetermined optical path couples a portion of the surface to a light source of predetermined spectral content while a second predetermined optical path couples the same surface portion to a detector. Disposed in at least one of the paths is a bandpass filter having a passband varying substantially continuously through the optical spectrum with the point of incidence of the optical path on the filter. Varying the point of incidence of the optical path on the filter produces an output from the detector which scans the optical spectrum. Preferably, the resolution of the optical system is such as to permit successive detector outputs representing about 180 different wavelengths each spaced about 1.7 nanometers apart. Preferably the continuous filter is a circular variable filter which intersects the optical path at an off-center location and which is rotated to scan periodically the optical spectrum.

In another aspect, my invention contemplates an on-line system for controlling the application of a plurality of colorants to a continuously formed material in which the reflectance of a portion of the material containing the colorants is measured at a plurality of wavelengths. The flow of the colorants to the material is then adjusted so as to minimize the sum of the squares of the deviations of the measured reflectances from predetermined desired reflectances. Preferably the reflectance measurements of the material are obtained by using a circular variable bandpass filter in the manner described in the preceding paragraph.

BRIEF DESCRIPTION OF THE DRAWINGS

In the accompanying drawings to which reference is made in the instant specification and in which like reference characters are used to indicate like parts in the various views:

FIG. 6 is a schematic view of a color control system incorporating the head shown in FIG. 1.

FIG. 8 is a graph illustrating the matching of the individual dye absorption spectra to the web reflectance spectrum measured by the system shown in FIG. 6.

DESCRIPTION OF THE PREFERRED EMBODIMENTS

Figure 1:
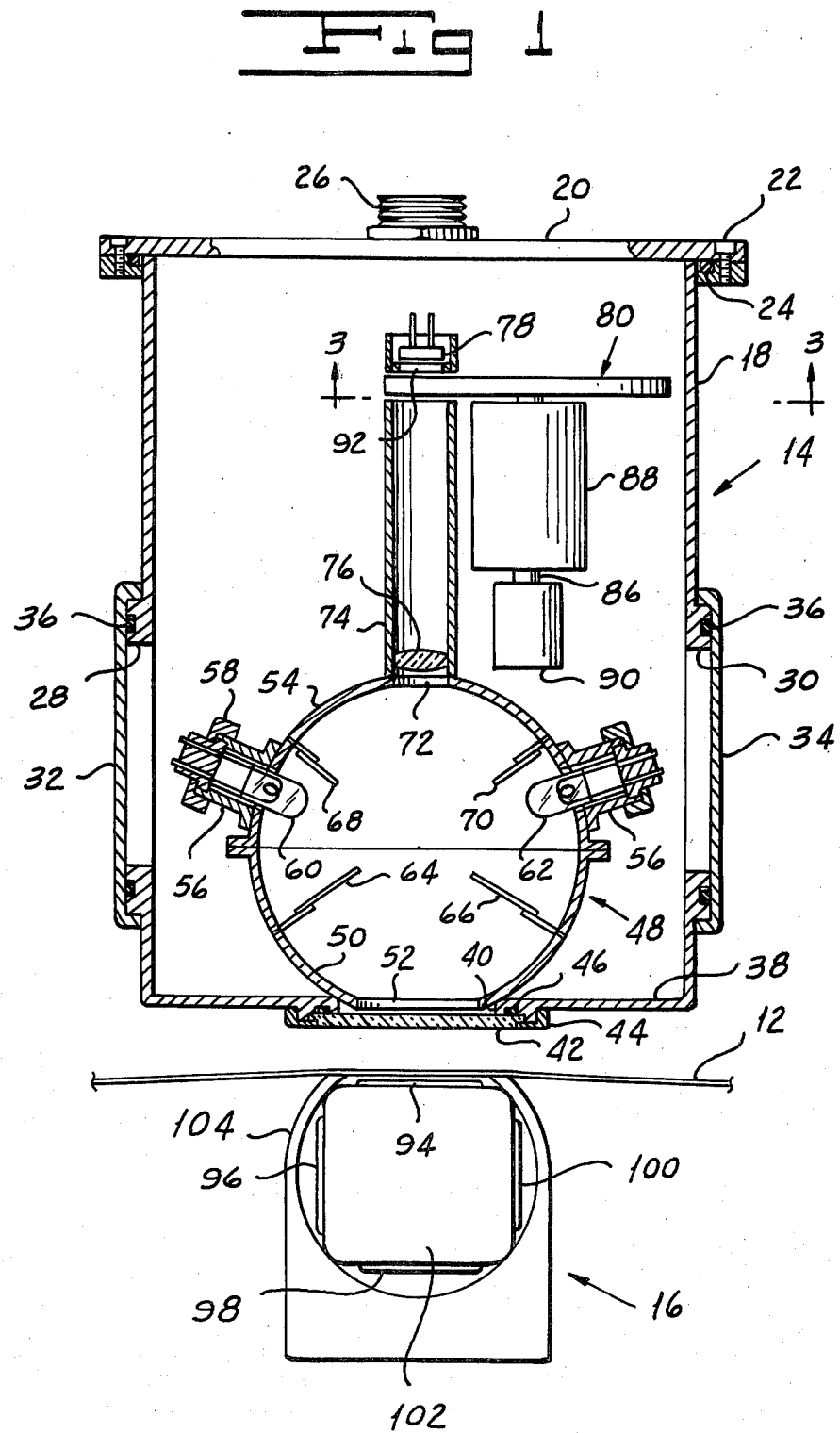
FIG. 1 is a side elevation, with parts shown in section, of the sensing head of my color measurement and control system.

Referring now to the drawings, the sensor portion of my system, indicated generally by the reference character 10, is adapted to measure the color of a web 12 of paper or the like. The sensor portion 10 includes an optical sensing head, indicated generally by the reference character 14, disposed above the web 12 and an optical shoe, indicated generally by the reference character 16, disposed below the head. Any suitable means (not shown) may be provided for mounting the head and shoe for movement out of associated relationship with the web 12.

The optical sensing head 14 includes a housing 18 to which a top plate 20 is secured by any suitable means such as by screws 22 into sealing engagement with a gasket 24 extending around the top of the housing. Top plate 20 carries a mounting stud 26 adapted to be secured to the head support (not shown). I provide the housing 18 with respective access openings 28 and 30 normally closed by covers 32 and 34 which engage gaskets 36 to seal the access openings 28 and 30.

The base 38 of the housing 18 is provided with an opening 40 over which a window 42 is secured. For example, a frame 44 carrying the window is adapted to be threaded onto a flange on the bottom 38 around opening 40 and into sealing engagement with a gasket 46.

The sensing head 14 includes a light-integrating sphere, indicated generally by the reference character 48, located inside housing 18 and made up of a lower half 50, formed with an opening 52 which registers with the window 42, and with an upper half 54 secured in operative relationship with the lower half in any suitable manner.

I secure respective bulb-mounting tubes 56 over openings in the upper sphere half 54. Caps 58 assembled on the tubes 56 hold bulbs 60 and 62 and their associated mounts in position in the tubes 56 to direct light into the interior of the sphere 48. I provide the lower sphere half 50 with a pair of light deflectors 64 and 66 and provide the upper sphere half 54 with light deflectors 68 and 70 for ensuring proper distribution of light from the sources 60 and 62 within the sphere while at the same time preventing the detector to be described hereinbelow, from being directly illuminated by the sources 60 and 62. While any suitable sources may be employed, preferably I employ two 50-watt tungsten-filament quartz-iodine lamps supplied by a constant-current source for the lamps 60 and 62.

Figure 2:
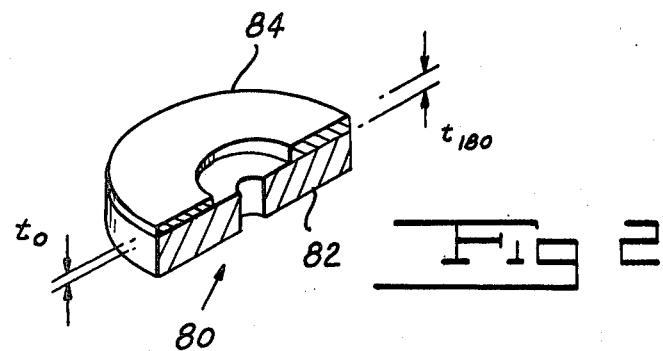
FIG. 2 is an oblique view of the circular variable filter used in the head shown in FIG. 1.
Figure 3:
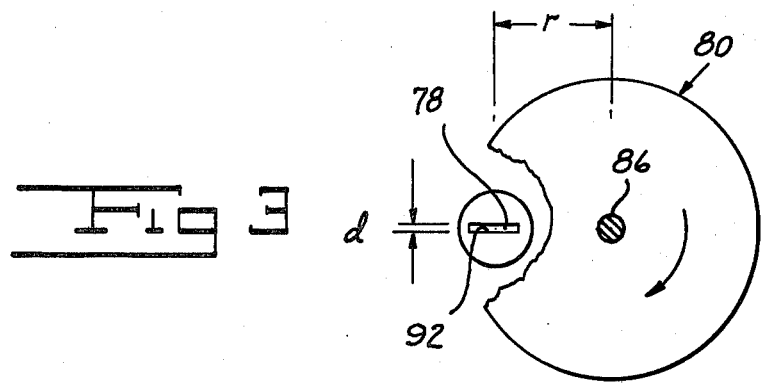
FIG. 3 is a fragmentary section of the head shown in FIG. 1, taken along line 3—3 thereof.

I form an opening 72 in the upper sphere half 54 through which reflected light from a spot portion of the web 12 is directed onto a detector. More specifically, a lens 76 disposed inside a tube 74, the lower end of which adjoins the opening 72, focuses light from the spot portion of the web 12 onto a photodetector 78 positioned at the upper end of the tube 74. Interposed between the detector 78 and the upper end of the tube 74 is a circular variable filter indicated generally by the reference numeral 80. As shown in FIG. 2, filter 80 comprises a substrate 82 having an interference filter coating 84 on one side thereof. In a manner known in the art, the thickness of the interference filter coating 84 that is applied to the substrate 82 varies with angular displacement about the axis of the filter 80. As a result, there is a corresponding angular dependence of the center wavelength that is passed by any particular angular segment of the filter coating 84. Thus, in the embodiment shown, the thickness $t_0$ of the thinnest, or 0°, coating segment is such as to pass a wavelength of about 400 nanometers, while the thickness of the 360° segment (not shown in FIG. 2) is such as to pass a wavelength of about 700 nanometers. Between these two extremes, the thickness—and hence passband wavelength—vary linearly with angular displacement, the thickness $t_{180}$ of the 180° segment, for example, being such as to pass a wavelength of about 550 nanometers.

Filter 80 is mounted on a shaft 86 of a suitable motor such as a stepper motor 88 which rotates the filter 80 to vary the wavelength transmitted to the detector 78. A position encoder 90 coupled to the motor shaft 86 provides a parallel digital output L on a line or channel 108 indicating the particular two-degree angular segment of the filter 80 that intercepts the optical axis. Preferably, to limit the circumferential extent of the filter 80 that is "seen" by the detector 78 at any particular instant, an optical slit-forming member 92 is disposed between the filter 80 and detector 78. Preferably the width d of the slit is such as to subtend about 2° at its average spacing r from the axis of the filter 80.

Shoe 16, which supports the web 12 as it moves past the head 14, comprises a housing 104 within which is disposed a rotatable block 102. Normally, during the color measurement or control phase of operation, block 102 is so oriented within housing 104 as to position a suitable standard reflecting surface 94 beneath the web 12. Block 102 also supports three additional reflecting surfaces 96, 98 and 100 which are rotated into position beneath the web 12 during calibration. These surfaces 96, 98 and 100 may comprise, for example, a standard "white" reflecting surface, a standard "black" reflecting surface and an additional reflecting surface for calibrating the response of the detector 78.

Figure 4:
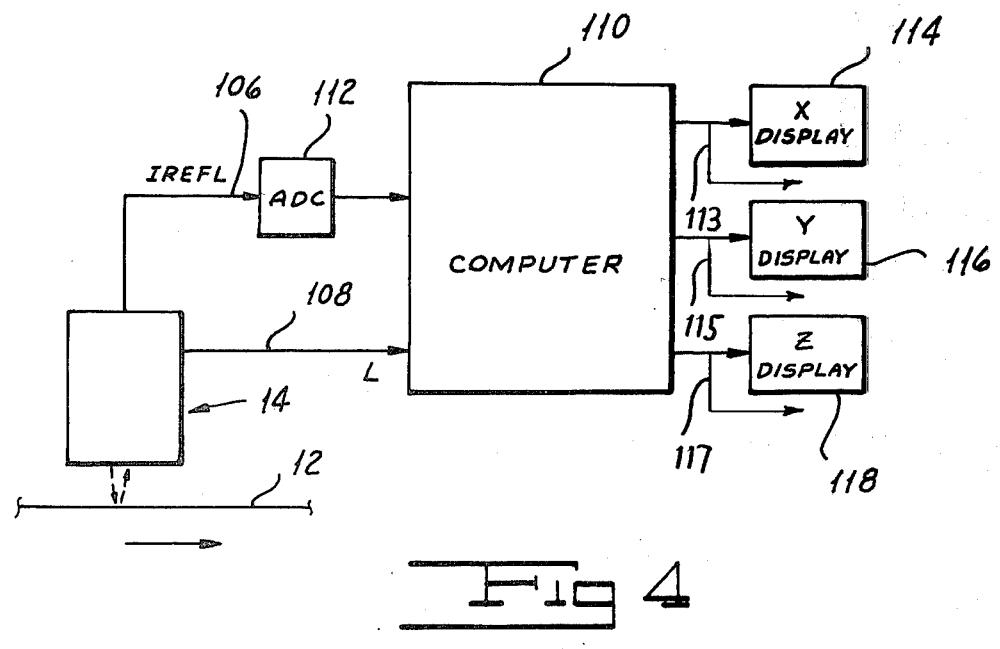
FIG. 4 is a schematic view of a tristimulus color measurement system incorporating the head shown in FIG. 1.

Referring now to FIG. 4, I show a system, indicated generally by the reference numeral 105, in which scanning head 14 supplies inputs to a computer which generates and displays the X, Y and Z tristimulus values of the light reflected from the web 12. More particularly, a digital computer 110 of any suitable type known to the art, such as a general purpose microcomputer, receives one data input from line 108, which carries the signal L indicating the angular position of the filter 80. A line 106 from the head 14, carrying the detector output IREFL which is proportional to the reflected light intensity, feeds an additional data input to computer 110 through an analog-to-digital converter (ADC) 112. Computer 110 provides a suitable digital output to an X display 114, a Y display 116 and a Z display 118. Displays 114, 116 and 118 may be of any suitable type known to the art such as, for example, segmental digital displays, strip chart recorders, or the like. In addition, the X, Y and Z outputs appear on respective lines 113, 115 and 117, which may provide inputs to a suitable control system (not shown) for regulating the application of dyes to the web.

Figure 5:
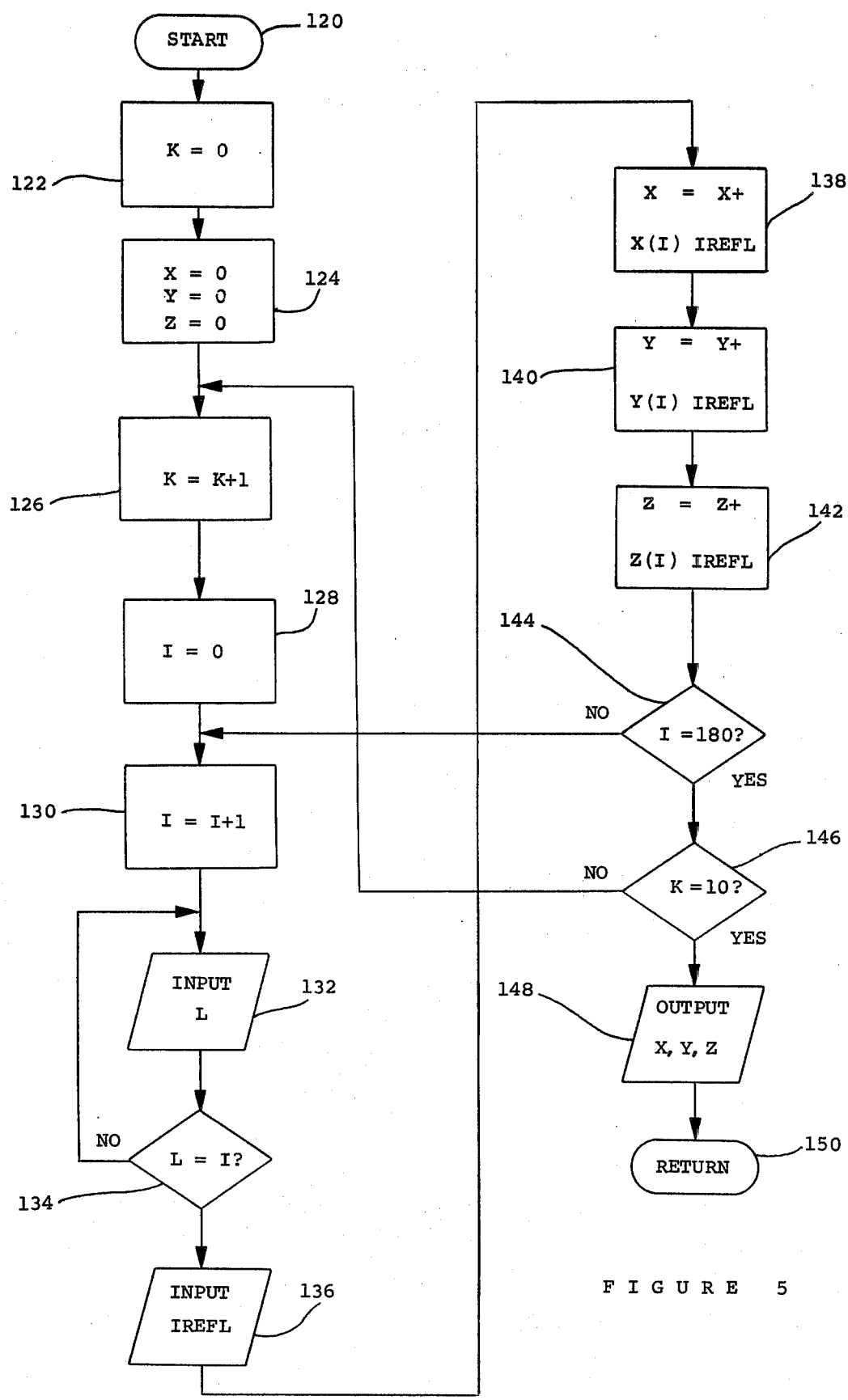
FIG. 5 is a flowchart of a program for controlling the operation of the system shown in FIG. 4.

Referring now to FIG. 5, I show a program which may be used by the computer 110 to generate tristimulus values X, Y and Z from the outputs L and IREFL of the scanning head 14. The program shown may typically be a subroutine that is repeatedly entered during the measurement phase of operation between periods of calibration. More particularly, after the subroutine is entered at block 120, an index K representing the number of complete revolutions of the filter 80 per averaging period is initialized at zero (block 122). After the tristimulus values X, Y and Z are also initialized at zero (block 124), the index K is incremented by 1 (block 126) while a second index I, indicating the particular 2° angular segment of the filter 80, is initialized at zero (block 128).

The index I is then incremented by 1 (block 130), and the position encoder signal L is interrogated to determine if it is equal to the index I (blocks 132 and 134), the motor 88 being either run continuously or stepped 2° each traverse of blocks 132 and 134. The subroutine waits until the position signal L matches the index I and then interrogates the detector output IREFL (block 136). The subroutine then uses the signal IREFL to update the tristimulus values X, Y and Z by adding to the previously stored values quantities proportional to the product of the detector output IREFL and the particular tristimulus value of the wavelength corresponding to the index I (blocks 138, 140 and 142). The subroutine continues along blocks 130 to 142 for each value of the index I until the index reaches 180, at which point the subroutine leaves the loop (block 144) and tests whether the index K has reached a predetermined value, in this case 10 (block 146). If the index K is less than 10, the subroutine returns to block 126 where it increments K by 1 and updates the tristimulus values X, Y and Z for another revolution of the filter 80. This process is continued until K reaches 10, at which point the subroutine feeds the finally computed tristimulus values X, Y and Z to the displays 114, 116 and 118 (block 148). The subroutine then returns (block 150) to the main program (not shown), which typically may immediately re-enter the subroutine shown in FIG. 5.

Referring now to FIG. 6, I show an embodiment of my invention in which the absorption spectra of the dyes are fitted by the method of least squares to the measured spectrum of the web to generate flow correction signals. In this system, indicated generally by the reference numeral 152, I use a computer 54 which may be similar or identical to the computer 110 shown in FIG. 4. Computer 154 receives the position signal L from the head 14 directly through a suitable input port. An analog multiplex circuit 156 receiving the IREFL signal from head 14 as one analog input provides a selected analog input to analog-to-digital converter (ADC) 158 in accordance with an address signal provided by the computer 154. ADC 158 provides a multi-bit digital output to an additional input port of computer 154.

Computer 154 provides flow control signals FC1, FC2 and FC3 via respective channels 160, 162 and 164 to digital-to-analog converters 166, 168 and 170. Converters 166, 168 and 170 control respective pumps 172, 174, and 176 controlling respective dye lines 178, 180 and 182 leading from die supplies 184, 186 and 188. Lines 178, 180 and 182 feed a single spray head 190 which applies the dye from the supplies 184, 186 and 188 to the web 12 moving past the head 190. Head 190 is, of course, located upstream from measuring head 14 to permit the head 14 to measure changes effected by adding dye to the web 12. Respective flow meters 192, 194 and 196 in dye lines 178, 180 and 182 provide measured flow inputs F1, F2 and F3 to the analog multiplex circuit 156 via respective lines 198, 200 and 202.

The relationship between the measured reflectance $R_i$ of the web 12 at a given wavelength $\lambda_i$ and the respective dye concentrations $c_1$, $c_2$ and $c_3$ as indicated by the dye flows F1, F2 and F3 is closely approximated by the following equation:

$$R_i = I_{refl}/I_{0i} \qquad (1)$$
$$= R_{0i}/\exp(X_{i1}c_1 + X_{i2}c_2 + X_{i3}c_3 + e_i)$$

where i is an index ranging from 1 to 180, $I_{refl}$ is the measured intensity of reflected light from the web 12 as indicated by the signal IREFL; $I_{0i}$ is the previously determined indensity of light incident on the same web portion at wavelength $\lambda_i$; $R_{0i}$ is the reflectance of the undyed sheet at wavelength $\lambda_i$; $X_{i1}$, $X_{i2}$ and $X_{i3}$ are predetermined constants; and $e_i$ is a random error term reflecting such factors as deviations in actual undyed sheet reflectance, deviations in actual dye strength or composition, and the like.

Equation (1) may be restated in terms of the following equation:

$$Y_i = -\ln(R_i/R_{0i}) \qquad (2)$$
$$= X_{i1}c_1 + X_{i2}c_2 + X_{i3}c_3 + e_i$$

Equation (2) may be re-expressed in matrix notation as follows:

$$Y = Xc + e \qquad (3)$$

where

Y is a column vector with elements $Y_1, Y_2, \ldots Y_{180}$;
e is a column vector with elements $e_1, e_2, \ldots e_{180}$;
c is a column vector with elements $c_1, c_2, c_3$; and
x is a 180×3 matrix with elements $X_{ij}$.

Standard regression theory tells us that an "estimated" or "effective" dye concentration vector $c_e$, that is, the quantity that minimizes the square error $$(Y - Xc)'(Y - Xc) \qquad (4)$$

where $(Y - Xc)'$ is the transpose of $(Y - Xc)$, is given by the expression $$c_e = (X'X)^{-1}X'Y \qquad (5)$$

Or, more simply, the concentration vector $c_e$ can be expressed as $$c_e = AY \qquad (6)$$

where $$A = (X'X)^{-1}X' \qquad (7)$$

In the system contemplated, the "effective" dye concentrations obtained in this manner are compared with previously determined desired concentrations to establish concentration "errors" due to the factors mentioned above. The respective actual dye concentrations as indicated by the dye flow meters are then offset by amounts equal to those concentration errors to generate corrected concentrations of dyes to be applied to the web. These corrected dye concentrations minimize the total square error between the measured reflectance spectrum and the desired reflectance spectrum of the web.

To see that this is the case, let us define $c_d$ as a three-dimensional column vector of the theoretical desired dye concentrations assuming no error vector e; $\Delta c$ as the quantity defined by the equation $$\Delta c = c_e - c_d \tag{8}$$

and $c_k$ as the quantity defined by the equation $$c_k = c - \Delta c \tag{9}$$

where c, as stated before, represents the actual dye concentrations corresponding to the dye flows F1, F2 and F3.

If we now change the actual dye concentrations to $c_k$, then the new value of Y is given by the expression $$Y_k = X c_k + e \tag{10}$$

On the other hand, the theoretical desired concentrations $c_d$ would, assuming an error vector e of zero, result in a "desired" value of Y of $$Y_d = X c_d \tag{11}$$

The difference, or error, between these two quantities is $$Y_k - Y_d = X c_k + e - X c_d \tag{12}$$

Applying equations (3), (8) and (9), this reduces to $$\begin{aligned} Y_k - Y_d &= Xc + e - Xc_e \\ &= Y - Xc_e \end{aligned} \tag{13}$$

where Y is the value obtained with the original actual concentrations c. Since, however, we have already minimized the square of the right-hand side of equation (13) by our selection of $c_e$, we have minimized the square of the "error" expression on the left side as well.

Figure 7A:
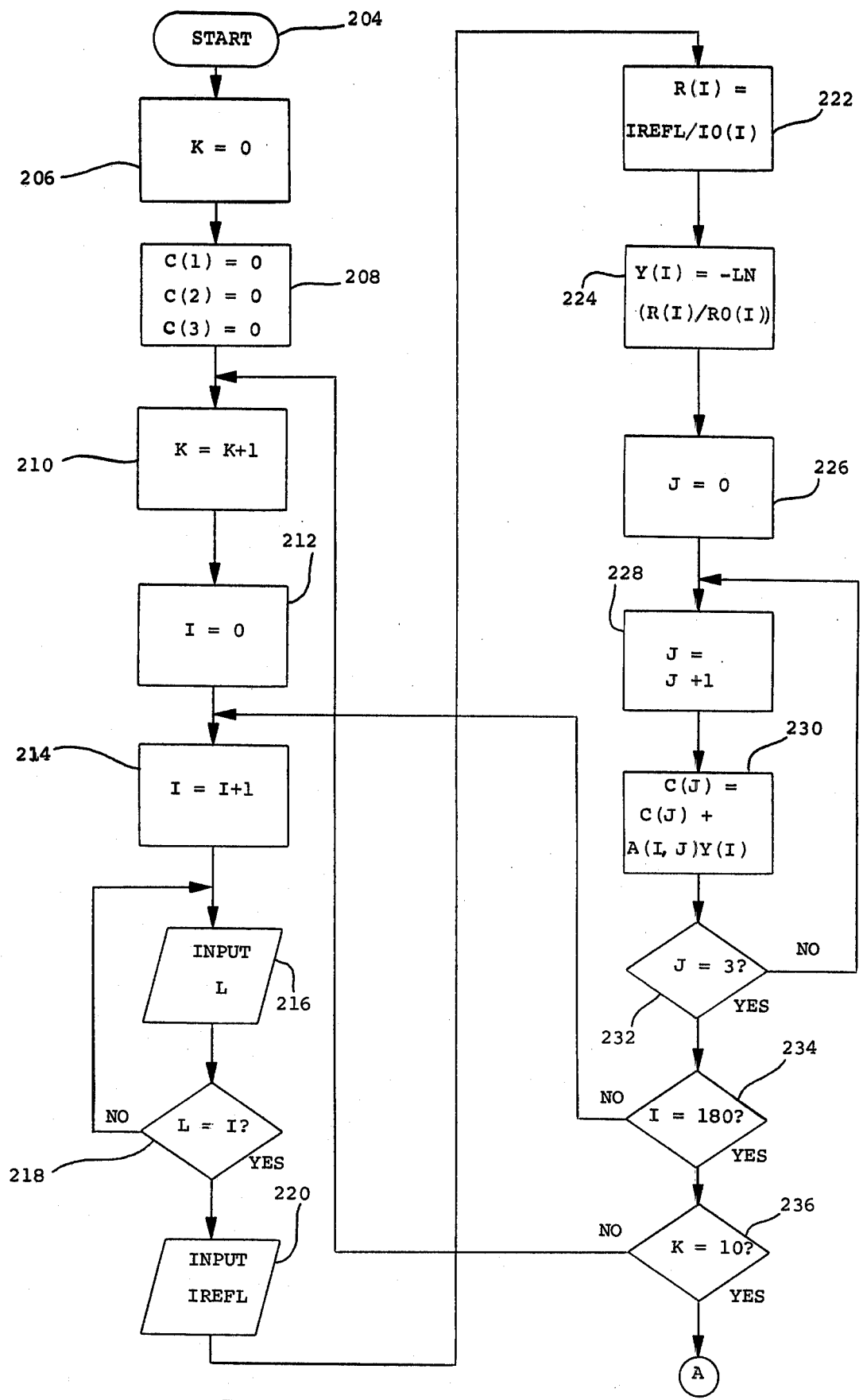
FIGS. 7a and 7b are a flowchart of a program for controlling the operation of the system shown in FIG. 6.
Figure 7B:
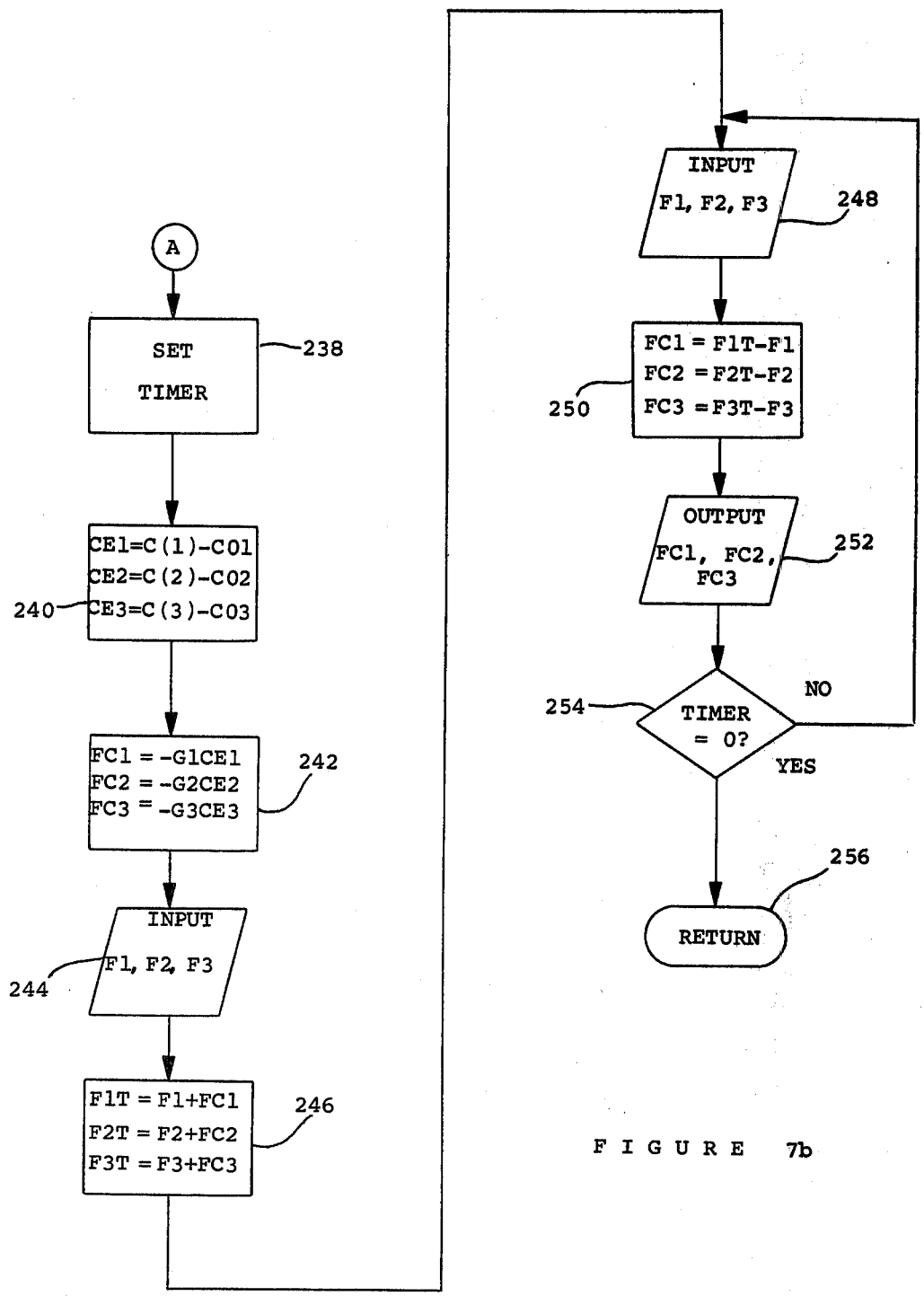

Referring now to FIGS. 7a and 7b, I show a program for controlling the application of dye from supplies 184, 186, 188 in accordance with the color of the dyed web 12 as sensed by the head 14. Like the program shown in FIG. 5, the program shown in FIGS. 7a and 7b may typically be repeatedly entered as a subroutine between successive calibrations of the system 152. After entry at block 204, the subroutine initializes to zero an index K indicating the number of revolutions of the filter 80 (block 206), as well as the quantities C(1), C(2), and C(3) corresponding to the components of the "effective" dye concentration vector $c_e$ (block 208). The subroutine then increments K by 1 (block 210) and initializes the index I, corresponding to the index i in equations (1) to (13) (block 212). Next, the subroutine increments the index I by 1 (block 214) and waits (blocks 216 and 218) until the position signal L from the head 14 matches the index I. When this occurs, the subroutine suitably addresses the multiplex circuit 156 to input the measured light intensity IREFL (block 220).

After it has obtained the reflected light intensity signal IREFL, the subroutine divides this quantity by a previously stored value I0(I) (corresponding to $I_{0i}$) indicating the incident light intensity at that wavelength to generate a signal R(I) (corresponding to $R_i$) indicating the reflectance of the web 12 at the wavelength indicated by the index I (block 222). The subroutine divides the quantity R(I) by a previously stored quantity R0(I) (corresponding to $R_{0i}$) indicating the reflectance of an undyed web portion at that wavelength and takes the negative logarithm of the quotient to obtain a quantity Y(I) (corresponding to $Y_i$) that varies linearly with dye concentration (block 224). The subroutine then enters a loop (blocks 226 to 232) in which it revises the previously stored quantities C(1), C(2) and C(3) by adding to them terms proportional to the computed quantity Y(I). In block 230, the quantity A(I,J) corresponds to the element $A_{ij}$ of the least-square optimization matrix defined in equation (7).

The subroutine next interrogates I to determine whether it has reached 180 and, if not, returns to block 214 to obtain and process the measured light intensity IREFL at the next wavelength I, the subroutine reiterating blocks 214 to 234 for each value of the index I. When this loop has been traversed for all values of the index I up to 180, the subroutine leaves the loop (block 234) and interrogates the index K to determine whether it has reached a predetermined quantity, for example 10 (block 236). If not, the subroutine returns to block 210 and repeats the entire sequence (blocks 210 to 236) for another revolution of the filter 80.

After a suitable averaging interval of ten filter revolutions in this case (block 236), the subroutine initializes a timer (not shown) internal to the computer 154 to define a time interval for the control operation (block 238). During this period, the subroutine first generates respective concentration error signals CE1, CE2 and CE3 corresponding to the components of the error vector $\Delta c$ by subtracting from the respective estimated concentrations C(1), C(2) and C(3) the quantities C01, C02 and C03 corresponding to the elements of the desired concentration vector $c_d$ (block 240). The subroutine then generates respective flow control signals FC1, FC2 and FC3 by multiplying the concentration error signals CE1, CE2 and CE3 by previously determined coefficients $-G1$, $-G2$ and $-G3$ (block 242). After this, the subroutine generates a suitable address signal to obtain the flow inputs F1, F2 and F3 (block 244) and generates respective target flow values F1T, F2T, and F3T by adding to the respective measured flow signals F1, F2 and F3 the respective flow correction signals FC1, FC2 and FC3 (block 246).

The subroutine then enters a loop (blocks 248 to 254) in which it continually interrogates the measured flow values F1, F2 and F3 nd generates flow-control signals FC1, FC2 and FC3 on the basis of the difference between the measured flow values and the target flow values previously generated. These continually recomputed correction signals FC1, FC2, and FC3 are provided to the digital-to-analog converters 166, 168 and 170 controlling the pumps 172, 174 and 176. At the end of the interval determined by the timer in block 238, at a point when the measured flow values F1, F2 and F3 have converged upon target flow values F1T, F2T and F3T, the subroutine leaves the loop (block 254) and returns (block 256) to the program (not shown) calling the subroutine. As mentioned above, typically the subroutine shown in FIGS. 7a and 7b is repeatedly reentered between successive calibration periods of the apparatus 152.

In the system shown in FIG. 6, the flow correction signals FC1, FC2 and FC3 are generated by fitting the dye absorption spectra to the measured web reflectance spectrum to obtain the "effective" dye concentrations C(1), C(2) and C(3). However it will be apparent to those skilled in the art that the computational steps involved are commutative and that one could alternatively compare the measured reflectance spectrum with a desired spectrum and then fit the dye absorption spectra to the error spectrum thus obtained.

Referring now to FIG. 8, I show a graph illustrating the matching of the individual absorption spectra of the dyes to the measured reflectance spectrum of the dyed web 12. In FIG. 8, the abscissa represents the wavelength in nanometers while the ordinate represents the negative of the logarithm of the measured reflectance, as it is this quantity which is, to a first approximation, linearly dependent on the dye concentration. In FIG. 8, curve 258 corresponds to the measured reflectance of the dye of dyed web 12, while curves 260, 262 and 264 correspond respectively to the absorption spectra of the individual dyes, weighted by the estimated dye concentrations C(1), C(2) and C(3) obtained by the subroutine shown in FIGS. 7a and 7b. In this graph, it is assumed that the reflectance of an undyed web is independent of the wavelength $\lambda$ so that the spectrum corresponding to the sum of the curves 260, 262 and 264 represents a least-square approximation of the actual reflectance curve 258.

While the system 152 shown in FIG. 6 employs three dyes, it should be emphasized that my system is readily adaptable to control the simultaneous application of a greater number of dyes if more accurate color matching is desired. Indeed, one of the salient advantages of my dye control system employing least-square optimization is that it is not limited to only three dyes as are systems based on measurement of the tristimulus values X, Y and Z. In my system, for example, a color mismatch occurring over one portion of the visible spectrum can be corrected by using an additional dye that is selectively absorptive in that portion of the spectrum without affecting the color match elsewhere.

It will be seen that I have accomplished the objects of my invention. My color measurement and control system does not require matching of the spectral curves of its various optical components, and is relatively insensitive to changes in operating point. Finally, my system permits the independent control of four or more dyes.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention what I claim is:

1. A method of controlling the application of a plurality of colorants having known absorption spectra to a continuously formed material moving along a path including the steps of applying said colorants to said material at a first location along said path, continually measuring the actual reflectance spectrum of said material at a second location along said path spaced downstream from said first location, providing values corresponding to a desired reflectance spectrum of said material, each of said spectra comprising a relatively large number of substantially monochromatic components extending substantially over the rang visible wavelengths, said reflectance spectra having substantially uniform weighting as a function of wavelength, computing from each measured reflectance spectrum and from said absorption spectra the changes in concentration of said colorants which would minimize the sum of the squares of the differences between corresponding components of a subsequently measured reflectance spectrum and said desired reflectance spectrum, and changing the concentrations of said colorants applied to said material at said first location in accordance with said computed concentration changes.

2. A method as in claim 1 in which said colorants are transparent colorants.

3. A method as in claim 1 in which said colorants are dyes.

4. A method as in claim 1 in which said computing step includes the steps of comparing said measured reflectance spectrum with said desired reflectance spectrum to obtain an error spectrum and computing from said error spectrum said changes in concentration of said colorants.

5. An on-line system for controlling the application of a plurality of colorants having known absorption spectra to a continuously formed material moving along a path including in combination means for applying said colorants to said material at a first location along said path, means for continually measuring the actual reflectance spectrum of said material at a second location along said path spaced downstream from said first location, means for providing values corresponding to a desired reflectance spectrum of said material, each of said spectra comprising a relatively large number of substantially monochromatic components extending substantially over the range of visible wavelengths, said reflectance spectra having substantially uniform weighting as a function of wavelength, means for computing from each measured reflectance spectrum and from said absorption spectra the changes in concentration of said colorants which would minimize the sum of the squares of the differences between corresponding components of a subsequently measured reflectance spectrum and said desired reflectance spectrum, and means for changing the concentrations of said colorants applied to said material at said first location in accordance with said computed concentration changes.

6. Apparatus as in claim 5 in which said colorants are transparent colorants.

7. Apparatus as in claim 5 in which said colorants are dyes.

8. Apparatus as in claim 5 in which said computing means includes means for comparing said measured reflectance spectrum with said desired reflectance spectrum to obtain an error spectrum and means for computing from said error spectrum said changes in concentration of said colorants.

* * * * *

UNITED STATES PATENT AND TRADEMARK OFFICE
CERTIFICATE OF CORRECTION

PATENT NO. : 4,439,038
DATED : March 27, 1984
INVENTOR(S) : John W. Mactaggart

It is certified that error appears in the above-identified patent and that said Letters Patent are hereby corrected as shown below:

Column 10, line 8, "rang" should read -- range of --.

Signed and Sealed this

Twenty-sixth Day of June 1984

[SEAL]

Attest:

GERALD J. MOSSINGHOFF

Attesting Officer

Commissioner of Patents and Trademarks